Nov. 19, 1929.  J. KRUKOWSKI  1,736,537
TAILOR'S PRECISION MEASURE
Filed July 19, 1927
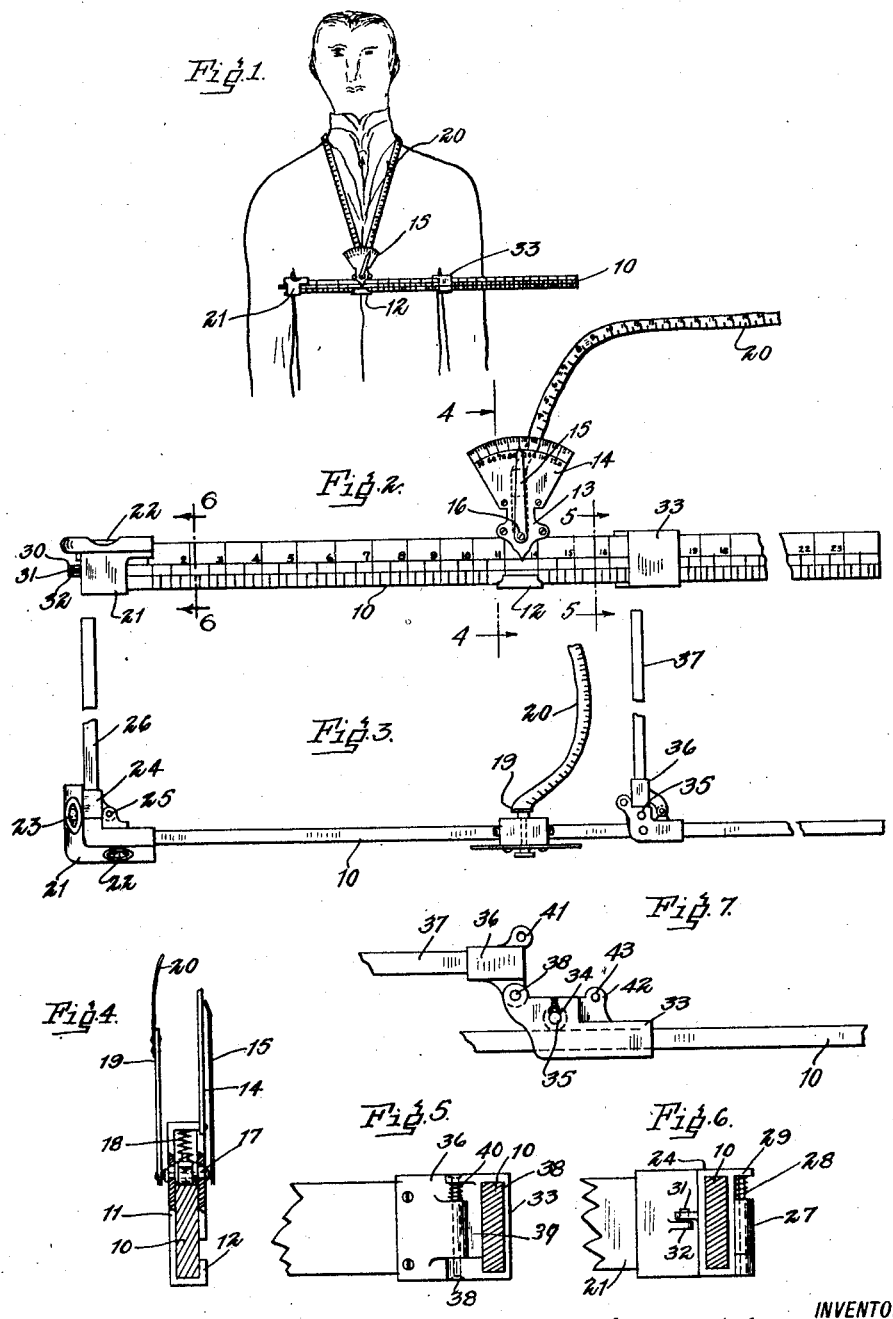
INVENTOR
Joseph Krukowski Patented Nov. 19, 1929

1,736,537

UNITED STATES PATENT OFFICE

JOSEPH KRUKOWSKI, OF BROOKLYN, NEW YORK

TAILOR'S PRECISION MEASURE

Application filed July 19, 1927. Serial No. 206,891.

This invention relates to improvements in measuring instruments, particularly in an apparel measuring instrument for use by tailors to fit garments etc., and it is the principal object of my invention to provide an instrument of this character indicating at a glance the proper angles and dimensions.

Another object of my invention is the provision of a tailor's precision measuring instrument combined with a rule and tape measure.

A further object of my invention is a measuring instrument for tailors equipped with a suitable level or levels, and indicator hand for indicating the angles of deviation from a center line.

A still further object of my invention is the provision of a tailor's measure having an arm angularly disposed thereto, another arm, also angularly disposed, sliding along a rule provided with proper graduations and adapted to be locked in its proper adjustment, while allowing a folding against said rule when not in use.

These and other objects and advantages of my invention will become more fully apparent as the description thereof proceeds and will then be more specifically defined in the appended claims.

In the accompanying drawing forming a material part of this disclosure:—

Fig. 1 illustrates as an example the use of a measuring device constructed according to my invention for fitting a coat collar, and adapted to measure any deviation from a center line for instance on deformed persons.

Fig. 2 is a front elevation of my novel and improved measuring instrument, and its tape measure combined therewith.

Fig. 3 is a top plan view thereof.

Fig. 4 is a section on line 4—4 of Fig. 2.

Fig. 5 is a section on line 5—5 of Fig. 2 of one, the movable member of the measuring instrument.

Fig. 6 is a similar view of the locking member, the section being taken on line 6—6 of Figure 2.

Fig. 7 is a detail side elevation of the slide member.

As illustrated, the measuring instrument comprises a rule or longitudinal bar 10 provided with graduations on its front face.

A bracket 11 is slidably held to the rule by means of its flanged foot 12 engaging the lower front edge thereof, and has attached to its front part 13, having the shape of a pointer, and overlapping the upper front edge of the rule, a segmentally-shaped dial plate 14 having proper dial numbers thereon near its upper margin over which glides a hand 15 pivoted at 16 to the part 13. The rear part of the bracket 11 and front part 13 thereof are connected above the upper edge of the rule to form an open frame in which rollers 17, mounted on a suitable carriage roll along the upper edge of the rule, and the rollers 17 are held in engagement with the upper edge of rule 10 by springs 18. The pivot pin of hand 15 is extended to the rear of the bracket where it carries a plate 19 to which is suitably attached a tape measure 20.

To one end of the rule is attached a bracket 21 carrying levels 22, 23, angularly disposed to each other near the upper edge of the rule.

To the rear of bracket 21 at a distance from its outer end a sleeve 24 is hingedly attached, as at 25, in which is secured one end of an arm or member 26 adapted to be set at a right angle to rule 10. The hinge sleeve 27 of sleeve 24 is pressed by a spring 28 wound about the hinge pintle 29 for an arm for a purpose later to be described; the sleeve 24 carries at its outer face an eye 30 adapted to receive a screw 31 while an eye 32, is provided on the outer face of bracket 21, so that when the sleeve is laterally displaced against the action of spring 28, the eyes 30 and 32 come in alignment and can be connected by the screw 31, thus allowing a locking of arm 26 at a right angle to the rule.

At the opposite end of the rule a bracket 33 is guided along the rule on rollers 34 in depressions of the bracket on a pin 35, and a sleeve 36 carrying an arm 37 is hingedly attached by a pin 38 to bracket 33. The hinge sleeve 39 of the hinge connection being laterally pressed by a spring 40 wound about the pin 38 for a purpose later to be described.

At its outer face, the sleeve 36 carries an eye 41, and the bracket 33 carries on its inner face near the roller 34, an eye 42 adapted to receive a pin or screw 43, so that both eyes can be connected when sleeve 39 is laterally displaced against the action of spring in order to lock the arm 37 in a position at a right angle to rule 10.

The operation of my device will be entirely clear from the above description, especially when considering Fig. 1. It frequently happens, when merely using a tape measure, especially with slightly deformed persons, that the exact center of the collar's front part, for instance, cannot be established or ascertained with precision and consequently ill fitting garments are made and furnished.

This disadvantage is avoided by the use of my improved measuring instrument, the pointer of which will always indicate a variation from the center line. Moreover the levels will indicate that the measurements are taken at the exact places they are intended to be taken, and not with a slant, which with the use of the tape measure alone would change the measurements considerably, especially when taking measure of a stout person. The sliding bracket will give exact measurements on the rule and will allow an accommodation to all sizes of persons and locking in this position with the arms at a right angle to the rule, so that every error in reading the measurements is positively avoided. A simple compression of the hinge springs will permit this locking, while the instrument when not in use can be conveniently folded.

It will be understood that I may make such changes as come within the scope of the appended claims without departing from my invention.

Having thus described my invention what I claim as new, and desire to secure by Letters Patent is:—

1. In an instrument of the class described, a rule, a bracket longitudinally displaceable on said rule, rollers for facilitating its displacement, a sleeve hinged to said bracket, adapted to receive an arm, an eye on said sleeve, an eye on said bracket, means for normally keeping said eyes out of alignment but allowing their alignment, and a pin adapted to be received by said eyes when in alignment for locking the parts in their adjusted relative positions.

2. In an instrument of the class described, a rule, a bracket adapted to be attached to one end of said rule, levels, angularly disposed to each other on the upper edge of said bracket, a sleeve hinged to the inner rear end of the bracket, an arm held in said sleeve, a pintle for the hinge, a hinge member on said sleeve sliding on said pintle, a spring wound about said pintle adapted to press the sleeve normally towards one side, an eye on said sleeve and an eye on said bracket adapted to be brought into alignment upon the displacement of said sleeve against the action of said spring, and a screw adapted to engage both eyes for locking the arm in angular position to said rule.

3. In an instrument of the class described, a rule, a bracket forming a frame, a flanged foot on said bracket engaging the lower front edge of the rule for holding said bracket to said rule, a segmentally-shaped dial plate attached to the front of said bracket, a hand pivoted to said bracket gliding on said dial plate, rollers in said frame, and springs holding said rollers in engagement with the upper edge of said rule, a plate at the rear of said bracket on the pivot point of said hand, a tape measure attached to said plate, a level-carrying bracket attached to one end of said rule, said levels angularly disposed to each other, a sleeve hingedly attached to said level-carrying bracket, an arm secured in said sleeve, means for locking said arm at a right angle to the rule, a bracket slidably guided along the rule at the end opposite to said level-carrying bracket, a sleeve hingedly attached to said last named bracket, an arm in said sleeve, an eye on said sleeve, and an eye on said bracket, a pin adapted to be passed through both eyes in their aligned positions for locking said sleeve arm in a position at a right angle to said rule, and springs associated with said hinges adapted to be compressed upon locking of said arms at a right angle to said rule and retracted upon folding of the instrument when not in use.

Signed at New York in the county of New York and State of New York this 9th day of July, A. D. 1927.

JOSEPH KRUKOWSKI.